(12) United States Patent
Sheardown et al.

(10) Patent No.: US 7,674,781 B2
(45) Date of Patent: Mar. 9, 2010

(54) HYALURONIC ACID-RETAINING POLYMERS

(76) Inventors: Heather Sheardown, 44 Sheardown Dr., Nobleton, Ontario (CA) L0G 1N0; Mark Van Beek, 1712 Main St. West, Apartment 206, Hamilton, Ontario (CA) L8S 1G7; Jian Guo, 233 Jackson St. West, Apartment 1002, Hamilton, Ontario (CA) L8P 4R4

( * ) Notice: Subject to any disclaimer, the term of this patent is extended or adjusted under 35 U.S.C. 154(b) by 182 days.

(21) Appl. No.: 11/796,609

(22) Filed: Apr. 27, 2007

(65) Prior Publication Data

US 2007/0293648 A1 Dec. 20, 2007

Related U.S. Application Data

(60) Provisional application No. 60/795,595, filed on Apr. 28, 2006.

(51) Int. Cl.
A61K 31/728 (2006.01)
C08G 77/00 (2006.01)
C08G 73/02 (2006.01)

(52) U.S. Cl. .................. 514/54; 528/25; 528/322

(58) Field of Classification Search ............. 528/322
See application file for complete search history.

(56) References Cited

U.S. PATENT DOCUMENTS

| | | | | |
|---|---|---|---|---|
| 4,582,865 A | * | 4/1986 | Balazs et al. | 524/29 |
| 4,716,224 A | * | 12/1987 | Sakurai et al. | 536/55.1 |
| 5,387,632 A | * | 2/1995 | Lai et al. | 526/279 |
| 5,616,568 A | * | 4/1997 | Pouyani et al. | 514/54 |
| 5,681,825 A | * | 10/1997 | Lindqvist et al. | 514/54 |
| 5,789,462 A | * | 8/1998 | Motani et al. | 523/106 |
| 5,874,417 A | * | 2/1999 | Prestwich et al. | 514/54 |
| 6,086,597 A | * | 7/2000 | Fergeus et al. | 606/107 |
| 6,214,331 B1 | * | 4/2001 | Vanderhoff et al. | 424/78.17 |
| 6,326,011 B1 | * | 12/2001 | Miyazawa et al. | 424/401 |
| 6,368,585 B1 | * | 4/2002 | Fergeus et al. | 424/78.04 |
| 6,537,795 B1 | * | 3/2003 | Ståhl | 435/253.4 |
| 6,831,172 B1 | * | 12/2004 | Barbucci et al. | 536/53 |
| 6,903,199 B2 | * | 6/2005 | Moon et al. | 536/20 |
| 6,933,352 B2 | * | 8/2005 | Tsuchida et al. | 525/420 |
| 7,091,283 B2 | * | 8/2006 | Muller et al. | 525/292 |
| 2002/0018898 A1 | * | 2/2002 | Opolski | 428/423.1 |
| 2002/0049281 A1 | * | 4/2002 | Zhao et al. | 525/54.3 |
| 2003/0100739 A1 | * | 5/2003 | Tsai et al. | 530/354 |
| 2003/0161801 A1 | * | 8/2003 | Yamasaki et al. | 424/65 |
| 2005/0164980 A1 | * | 7/2005 | Shimoboji | 514/54 |
| 2006/0110458 A1 | * | 5/2006 | Hahn et al. | 424/488 |
| 2006/0189516 A1 | * | 8/2006 | Yang et al. | 514/8 |
| 2006/0293277 A1 | * | 12/2006 | Leshchiner et al. | 514/54 |
| 2007/0134334 A1 | * | 6/2007 | Hahn et al. | 424/488 |
| 2007/0149441 A1 | * | 6/2007 | Aeschlimann et al. | 514/8 |

OTHER PUBLICATIONS

Cassinelli, C. et al., Evaluation of interfacial properties of hyaluronan coated poly(methylmethacrylate) intraocular lenses. 2000 J. Biomater. Sci. Polymer Edn, 11(9), 961-977.

Chen, H. et al., Surface properties of PEO-silicone composites: reducing protein adsorption. 2005 J. Biomater. Sci. Polymer Edn, 16(4), 531-548.

Elbert, D. L. et al., Surface treatments of polymers for biocompatibility. 1996 Annu. Rev. Mater. Sci. 26, 365-394.

(Continued)

*Primary Examiner*—Randy Gulakowski
*Assistant Examiner*—Robert Loewe

(57) ABSTRACT

Hyaluronic acid-retaining biopolymer is provided which exhibits low levels of protein adsorption and surface friction. The biopolymer is useful for incorporation in products, such as contact lenses, used in biological environments.

21 Claims, 14 Drawing Sheets

OTHER PUBLICATIONS

Holzer, M. P. et al., Effect of healon5 and 4 other viscoelastic substances on intraocular pressure and endothelium after cataract surgery. 2001. J Cataract Refract Surg., 27(2), 213-218.

Jones, L. et al., An in vivo comparison of the kinetics of protein and lipid deposition on group II and group IV frequent-replacement contact lenses. 2000. Optom Vis Sci, 77(10), 503-510.

Lofas, S. Dextran modified self-assembled monolayer surfaces for use in biointeraction analysis with surface plasmon resonance. Pure Appl. Chem. 1995 67(5) 829-834.

Nicolson, P.C. et al., Soft contact lens polymers: an evolution. 2001 Biomaterials 22(24), 3273-3283.

Park, S.N. et al., Biological characterization of EDC-crosslinked collagen-hyaluronic acid matrix in dermal tissue restoration. Blomaterials 2003 24(9), 1631-1641.

Yokoi, N. et al., Effectiveness of hyaluronan on corneal epithelial barrier function in dry eye. 1997 Br. J. Ophthalmol., 81, 533-536.

Aragona, P. et al., Sodium hyaluronate eye drops of different osmolarity for the treatment of dry eye in Sjögren's syndrome patients. Br. J. Ophthalmol. 2002; 86; 879-884.

* cited by examiner

HYALURONIC ACID-RETAINING POLYMERS

RELATED APPLICATION

This application claims the benefit of U.S. Provisional Application No. 60/795,595, filed on Apr. 28, 2006. The entire teachings of the above application are incorporated herein by reference.

FIELD OF THE INVENTION

The present invention relates to novel hyaluronic acid retaining polymers.

BACKGROUND OF THE INVENTION

Reducing protein fouling on biomaterials is desired in a number of applications. For example, deposition of proteinaceous tear film components onto contact lens materials has been suggested to result in reduced visual performance [1], comfort [2,3], and in-eye wettability [4], as well as to produce inflammatory complications [5,6,7]. End of day dryness, potentially the result of the presence of a protein layer, has been reported as being experienced by between 25% and 30% of soft contact lens wearers [8], with 35% of patients permanently ceasing use of contact lenses due to complications associated with discomfort and dryness [9].

To alleviate these problems, lens companies have developed novel lens materials. One such material, recently introduced by CIBA Vision contains an internal wetting agent which is reported to be released throughout the day, providing a wetted layer. Another material, introduced by Johnson and Johnson Vision Care in Europe is reported to contain an internal wetting agent which is not released but which migrates to the surface of the material, again providing a continuously wetted surface that presumably has decreased protein adsorption.

Materials with a wetting agent have also been suggested to exhibit increased lubricity and have lower coefficients of friction than their unmodified counterparts. Lubricity is not only important for lens materials, but also in materials having other applications. For example, pacemaker leads must be coated with an insulating material, usually a silicone based polymer, for obvious reasons. However, when these materials are inserted, low surface friction between the material and the surrounding biological environment is critical. Similarly, intraocular lenses must pass through a small bore injector and therefore must have lubricious surfaces to minimize the potential for surgeon error on implantation.

It is desirable, thus, to develop a biomaterial having properties which alleviate at least one of the disadvantages of prior polymer-based biomaterials.

SUMMARY OF THE INVENTION

The present invention provides a hyaluronic acid-retaining polymer having improved properties for use as a biomaterial such as low surface friction and low protein deposition properties.

Thus, in one aspect of the present invention, there is provided a hyaluronic acid-retaining polymer.

In another aspect of the present invention, there is provided a method of making a hyaluronic acid-retaining polymer comprising the steps of:

a) incubating HA with a host polymer in the presence of a linking agent under conditions suitable to result in HA uptake by the polymer; and b) incubating the HA-polymer mixture with a facilitating agent for a period of time sufficient to result in retention of the HA within the polymer.

These and other aspects of the present invention are described by reference to the following figures in which:

DETAILED DESCRIPTION OF THE INVENTION

Figure 1:
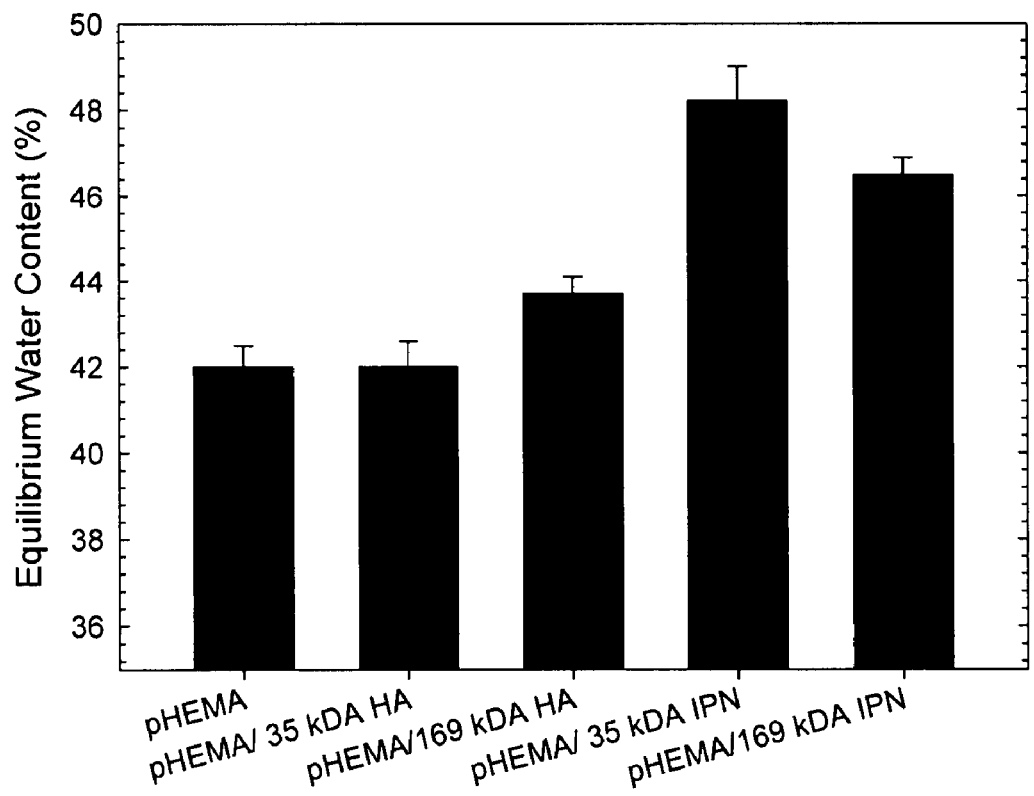
FIG. 1 graphically illustrates the equilibrium water uptake of various HA-containing HEMA hydrogel samples.

Novel hyaluronic acid-retaining polymers are provided which exhibit low levels of protein deposition and low surface friction.

Hyaluronic acid (HA), also known as "hyaluronan" or "hyaluronate" is a glycosaminoglycan. In particular, it is a polymer of disaccharides composed of D-glucuronic acid and D-N-acetylglucosamine, linked together via alternating beta-1,4 and beta-1,3 glycosidic bonds. Polymers of hyaluronic acid can range in size from $10^2$ to $10^6$ kDa in vivo. For the purposes of the present invention, HA of lower molecular weights, for example, between 6000 and 300,000, are employed to prepare the present HA-retaining polymers. Preferably, HA having a molecular weight of about 30,000 to about 180,000 is employed.

The term "polymer" or "biopolymer" is used herein to encompass polymers which are biocompatible, suitable for use with living tissue, for example in vitro and in vivo, and thus have potential to be used in biomedical applications. Accordingly, polymers for use in the present invention will not be toxic or otherwise unsuitable for such use. Examples of suitable polymers include polymers used in contact lenses, pacemaker leads and intraocular lenses including, but not limited to, acrylic-based polymers such as poly methyl methacrylate, poly (hydroxyethyl methacrylate) (pHEMA), poly N-isopropyl acrylamide, polyacrylic acid; polyurethanes and polyurethane ureas; silicone polymers (poly (dimethyl siloxane polymers)) including copolymers of methacryloxy propyl tris (trimethylsiloxy) silane (TRIS) and acrylic-based polymers such as pHEMA comprising various amounts of TRIS varying from about 1% to 99% TRIS; other hydrogel polymers including polyvinyl alcohol and biopolymers such as collagen.

The present HA-retaining polymers may be prepared by incubating HA in solution with a selected polymer under conditions suitable to result in polymer uptake of and retention of the HA. As one of skill in the art will appreciate, the conditions required for polymer uptake of HA may vary with the HA and solvent used, as well as with the nature of the host polymer. For the purposes of the present invention, the term "HA-retaining polymer" refers to polymer in which HA is immobilized or stably retained by the polymer.

In one embodiment, HA immobilization is accomplished by cross-linking of HA within the polymer. Cross-linking of HA is caused by addition of a linking agent to the HA/polymer solution. Examples of suitable linking agents include a dendrimer, or other multi-functional amine or multi-functional molecule containing appropriate chemical end groups for cross-linking. The term "dendrimer" is used herein to refer to a polymeric molecule composed of a repeating core monomer (i.e. a dendrimer core). A dendrimer has a branching shape and at least two end groups that are functional for cross-linking collagen. Depending on the dendrimer core (i.e. central or core monomer), the dendrimer may have 3, 4, 6, 8 (or more) branches. There are a large number of molecules which can be used as the core monomer for a dendrimer. For the purposes of the present invention, examples of suitable dendrimer cores include an alkyl-diamine such as ethyl-diamine and propyl-diamine; an alkyl dicarboxylic acid such as malonic acid, succinic acid and adipic acid; and an aldehyde-terminated dendrimers such as PAMAM. As used herein the term "alkyl" is not limited with respect to carbon number, as one of skill in the art will appreciate, and may include a $C_1$-$C_5$ alkyl group, for example, an alkyl group having 1-5 carbon atoms.

The HA-retaining polymer is prepared, thus, by incubating an aqueous solution of HA and a linking agent with a host polymer. The aqueous solution serves not only to dissolve the HA, but also to cause the polymer to swell to allow the polymer to absorb the HA and linking agent. Thus, the solution, in addition to water, will generally include a solvent, such as an alcohol, e.g. methanol, ethanol, propanol, isopropanol and butanol, suitable to satisfy these functions. Generally, HA and linking agent are present in about equal amounts (i.e. 1:1 molar ratio) within the polymer. These reactants are incubated for a period of time sufficient for HA and linking agent to be taken up, or absorbed into the polymer, for example, at least about 4 hours, and preferably several days to a 1 week or more. The application of heat may decrease HA uptake time by the polymer.

Once HA and linking agent are taken up by the polymer, incubation with a facilitating agent is required in order for crosslinking to occur between HA and cross-linking agent to form a stable HA-retaining polymer. The incubation is conducted for an amount of time required for the cross-linking to occur in the presence of an excess of facilitating agent. The facilitating agent is any agent capable of causing crosslinking between HA and the linking agent to occur. For example, where an amine-terminated dendrimer is used, crosslinking is facilitated by a carbodiimide, such as EDC or DDC(N,N'-Dicyclohexylcarbodiimide). Optimal conditions for this cross-linkage include a pH of between 5.0 and 6.0, preferably a pH of 5.5, and incubation overnight at 37° C. Where a carboxyl-terminated dendrimer is used, facilitating agents such as a carbodiimide or other facilitating agents may be used under polymerization conditions as described above. A stability agent, such as N-hydroxysulfosuccinimide (NHS) or 1-Hydroxybenzotriazole (HOBT), may optionally be used in the cross-linking reaction. A stability agent includes hydrophilic active groups that react rapidly with amines on the target molecule and increase the stability of the active intermediate which ultimately reacts with the attacking amine. Although not necessary for cross-linking to occur, stability agents such as NHS significantly increase yield of cross-linked product.

The hyaluronic acid-retaining biopolymers in accordance with the present invention contain at least about 1% HA, but may contain HA amounts of greater than 1%, such as amounts of 2% HA-5% HA up to amounts of about 10% HA.

The hyaluronic acid (HA)-retaining biopolymers of the present invention may exhibit significantly reduced levels of protein adsorption and surface friction, and increased lubricity, as compared with known biopolymers. For example, at least one of protein adsorption and surface friction may be reduced in an HA-retaining biopolymer of the present invention by at least about 10%, preferably by at least about 20% and most preferably by at least about 50% as compared with a corresponding unmodified biopolymer, i.e. a corresponding biopolymer not modified to incorporate and retain HA. Thus, the HA-retaining biopolymers are particularly useful for incorporation into devices for use in protein-containing environments in which protein adsorption is undesirable and/or in environments where reduced surface friction is desirable, for example, in devices such as contact lenses and other lenses used in protein-containing environments, in diagnostic probes and scopes used either in vitro or in vivo and in pace maker leaders.

Embodiments of the invention are described by reference to the following specific examples which are not to be construed as limiting.

EXAMPLES

Example 1

Preparation of an HA

Retaining Polymer

Materials 2-hydroxyethyl methacrylate (HEMA), ethylene glycol dimethacrylate (EGDMA), diaminobutane-4 (DAB-4) generation 1 dendrimer, 1-ethyl-3-(3-dimethylaminopropyl)-carbodiimide (EDC) and benzoyl peroxide were purchased from Sigma Aldrich (Oakville ON). IRGACURE was purchased from CIBA (Mississauga, ON). 35 kDa and 169 kDa hyaluronic acid were purchased from LifeCore Biomedical (Chaska, Minn.) while 900 kDa and fluorescently labeled HA were obtained from Sigma. Lysozyme (chick), human serum albumin (HSA), bovine β-lactoglobulin and immunoglobulin-G (IgG) (Human) were also obtained from Sigma.

Preparation of pHEMA Hydrogels pHEMA membranes were prepared according to standard techniques. Briefly, HEMA monomer was purified to remove the 4-methoxyphenol (MEHQ) polymerization inhibitor by passing the monomer through a column packed with Aldrich inhibitor removers (Sigma-Aldrich, Oakville ON). HEMA and 1% by weight EGDMA were mixed. To this, an equal amount of water by weight was then added and the mixture stirred. Subsequently, 1% by weight benzoyl peroxide, dissolved in a small amount of tetrahydrofuran (THF) in a 1.5 ml vial, was added. This final step required very rapid mixing to prevent the formation of a precipitate. This mixture was then poured into custom made Teflon® molds, placed in a 400 watt UV chamber (Cure Zone 2 Con-trol-cure, Chicago Ill.) and cured for 25 minutes. To ensure that all of the monomer was fully reacted, the molds were transferred to an oven at 50° C. for a period of 18 hours. Polymeric materials were then removed from the molds and placed in water for one to two days to ensure complete swelling prior to cutting as well as to remove any unreacted monomer in the samples. Samples of pHEMA were cut to the desired size, typically ¼ inch disks, placed in a 48 well plate and dried at 40° C. overnight.

Hyaluronic Acid Loading of Hydrogels

Hyaluronic acid (HA) solutions (5 g/L) were prepared in 30% ethanol/70% water. The composition of the ethanol/water solution was selected to maximize solvent uptake and HA loading into the hydrogel disks. Three molecular weights of HA, 30, 169 and 900 kDa, were studied. Dried hydrogel disks were placed in excess HA-containing solutions in 48-well plates, sealed and stored for a minimum of four days at 4° C. to ensure a maximum HA uptake.

Hyaluronic Acid Crosslinking

In order to physically entrap the HA into the pHEMA structure, crosslinking was effected. 1-ethyl-3-(3-dimethylaminopropyl)-carbodiimide (EDC) was used as a crosslinking facilitating agent. Diaminobutane-4 (DAB-4) generation 1 dendrimer was used as a cross-linking agent, providing multiple amine groups for crosslinking. pHEMA containing crosslinked HA was prepared by swelling the pHEMA membranes in 0.2 mL of a solution of hyaluronic acid (5 g/L) and diaminobutane-4 (DAB-4) generation 1 dendrimer (5 g/L) (Sigma, Milwaukee Wis.) in 30% ethanol/70% water for a minimum of four days at 4° C. to ensure complete uptake. Following loading, the samples were placed in a solution containing approximately 1% by weight EDC in water for a period of 24 hours at room temperature to result in crosslinking of the loaded HA. This step was followed by release of the unreacted HA and dendrimer by soaking in water for a minimum of two days prior to characterization. Control materials were prepared in the same manner but with no EDC present in the reaction solution.

Equilibrium Water Content

Samples were dried at 40° C. for a period of 2 days. Samples were weighed and placed in water for a period of a week. Samples were then removed from the solution and any excess water was removed by blotting with a Kimwipe®. Samples were then weighed and the equilibrium water content (EWC) of each was calculated using equation (1).

$$EWC = \frac{\text{Hydrated Weight} - \text{Dry Weight}}{\text{Hydrated Weight}} \quad (1)$$

Transmission Electron Microscopy

Samples of HEMA and HEMA-containing crosslinked HA/169 samples were embedded in Nanoplast® and sectioned at a thickness of approximately 60-80 nm using a Reichert Ultracut E microtome and placed on a 200 mesh Formvar® carbon-coated nickel grid. Sections were viewed and photographed using a JEOL 1200 EX electron microscope with an 80 kV electron beam.

Hyaluronic Acid Release

In order to determine the rate at which uncrosslinked HA present in the hydrogel could release into a surrounding aqueous fluid, HA release studies were performed. Surfaces were loaded with high molecular weight, fluorescently labeled HA. The HA was not crosslinked. Loaded samples were placed into PBS buffer at physiologic temperature and samples were taken at regular intervals. Samples were assayed for fluorescence using a fluorimeter. Release from crosslinked HA containing samples was also examined to determine whether the cross-linked HA was releasable.

Optical Transparency of HEMA/HA Materials

Transparency of the HA modified materials and the HA releasing materials was measured by UV spectrophotometry in a wavelength range between 400 and 700 nm.

Surface Hydrophilicity as Measured by Water Contact Angles

Sessile drop advancing and receding contact angles provide relative information about the surface hydrophilicity and hydrophobicity of the hydrogel samples. Samples were placed on glass slides and dried at 37° C. overnight. Milli-Q® water contact angles were measured with a drop volume no greater than 3 μL using a Ramé-Hart NRL 100-00 goniometer.

Atomic Force Microscopy (AFM)

2 μm×2 μm area samples were analyzed using a NanoScope® IIIa AFM (Digital Instruments) in surface tapping mode. 512 sample lines and 1:1 aspect ratio was used for all measurements. Sample surfaces were dried prior to analysis.

Tensile Strength Testing

The mechanical properties of the hydrogel samples were measured at room temperature using an Instron® Series XI Automated Mechanical Testing System with a 50 Newton load. Samples with hydrated dimensions of 4 cm by 1.5 cm were prepared. Hydrated samples were loaded and tensile strain and stress were measured using a crosshead speed of 5 mm/min. The top and bottom of each sample was wrapped in paper tape to protect the samples during clamping and to measure the properties of the samples rather than having the samples break due to the clamping.

Differential Scanning Calorimetry

A TA 2910 MDSC Differential Scanning Calorimeter was used to measure the glass transition temperature of the hydrogels produced. This method was used to discern any changes that may have occurred in the thermal properties of the hydrogel as a result of the incorporation and crosslinking of the HA. 2-10 mg freeze-dried samples of pHEMA, pHEMA/35 kDa un/crosslinked HA and pHEMA/169 kDa un/crosslinked HA were placed in a hermetically sealed pan and heated to 300° C. at a rate of 15° C./min.

Protein Adsorption to HA-Modified Hydrogels

Proteins were radiolabeled with $Na^{125}I$ or $Na^{131}I$ using the iodine monochloride method (ICI) as previously described (McFarlane, 1963). Unbound $^{125}I$ and $^{131}I$ were removed by passing the labeled protein samples through a 3 ml syringe packed with AG 1-X4 (100-200 dry mesh in chloride form) (Bio-Rad, Hercules, Calif.). Free iodide was measured by trichloroacetic acid precipitation of the protein. The free iodide of labeled HSA, lysozyme and IgG was, in all cases, less then 2% of total radioactivity; β-lactoglobulin had a free iodide of 10% on average, presumably due to the presence of fewer tyrosine and histidine residues in this protein.

A simulated tear solution (Bright, 1993), the composition of which is shown in Table 1, was prepared in PBS. In all studies, two radiolabeled proteins were used, one labeled using $^{125}$I and one labeled with $^{131}$I. Depending on the protein in question, the simulated tear solution contained between 3-8% (w/w) radiolabelled protein. Two brands of commercial lenses based on prior results (Van Beek, 2007) were included for comparison with the present HA-modified hydrogels.

TABLE 1

Model tear solution and amount of radiolabelled protein used for the study.

| Protein | Concentration (mg/ml) | % Radiolabelled Protein |
|---|---|---|
| Lysozyme | 1.9 | 8 |
| Albumin | 0.2 | 6 |
| IgG | 1.7 | 3 |
| β-lactoglobulin | 1.6 | |

Hydrogel samples, having been equilibrated in PBS, were wiped dry using a Kimwipe® and subsequently placed in 24-well plates. Artificial tear solutions (150 μl) were added to the sample wells and the samples were then incubated for two hours at room temperature. This was followed by three five minute rinses with fresh PBS buffer to remove any loosely adherent protein. The surfaces were subsequently counted for radioactivity using a Wizard® 3 1480 Automatic Gamma Counter (PerkinElmer) and the adsorbed amounts were calculated using background-corrected surface counts relative to the solution count for the individual protein solution.

Results and Discussion

Water Uptake and Transmission Electron Microscopy

All samples, including the non-crosslinked HA retaining and the crosslinked HA retaining hydrogels were transparent materials. There were no visible differences between the samples. Samples prepared were found to contain on average 5% HA. However, as shown in FIG. 1, water uptake for the various samples was significantly altered by the small amount of HA incorporated. Differences in the amount of water taken up when the HA was incorporated and, more importantly, cross-linked within the sample were clear. However, when the HA was not cross-linked, equilibrium water uptakes similar to those in the HEMA only membranes were observed. Water uptake is an important quality for certain applications of the present polymers, particularly their use in soft lenses, to allow oxygen and nutrient exchange with the surface of the eye.

Samples were measured prior to loading and the mass was compared after loading. While a measurable change in the mass of approximately 2 mg in a 10 and 20 mg sample was observed in all cases, the differences were not statistically significant when the accuracy of the balance was considered. Various surface and bulk analysis techniques including ATR FTIR, FTIR, and XPS showed minimal differences between HA loaded and crosslinked hydrogels relative to unmodified controls, likely the result of the chemical similarity of the HA with the HEMA and the relatively small amount of HA incorporated into the membrane.

Release Kinetics of Releasable Hyaluronic Acid

Figure 2:
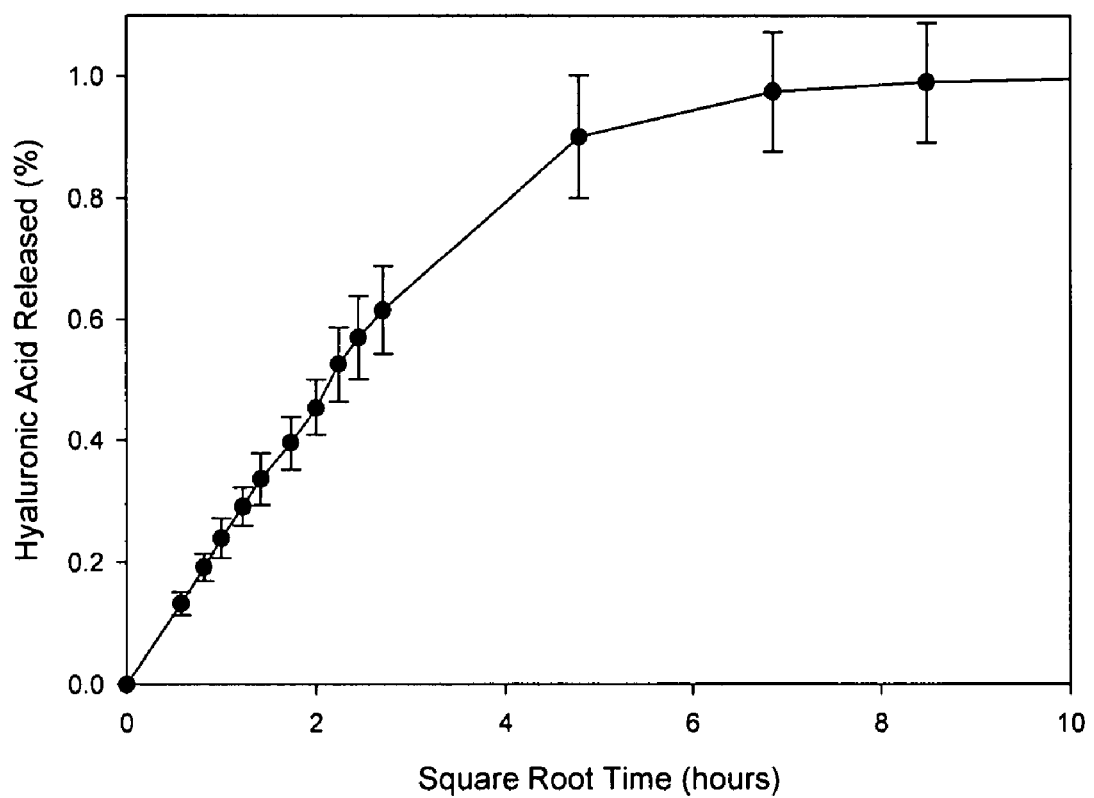
FIG. 2 graphically illustrates HA release from uncrosslinked HEMA samples.

Surfaces loaded with fluorescently labeled HA and released into PBS buffer yielded the release profile shown in FIG. 2, a typical burst release profile with a duration of approximately five hours and 90% release after 1 day, followed by gradually decreasing release and exhaustion of the compound within 60-80 hours It was assumed that all of the HA loaded into the pHEMA was released over time due to the highly swollen nature of the HEMA membrane. A commercially available fluorescently labeled HA with a molecular weight of 900 kDa was used for these studies for ease of quantification. While the molecular weight of the HA used in this study was higher than that used in other studies described herein, it is expected that shorter release times would result when the HA molecular weight was lower. No measurable HA release from the crosslinked materials was observed.

Optical Transparency of HEMA/HA Materials

Figure 3:
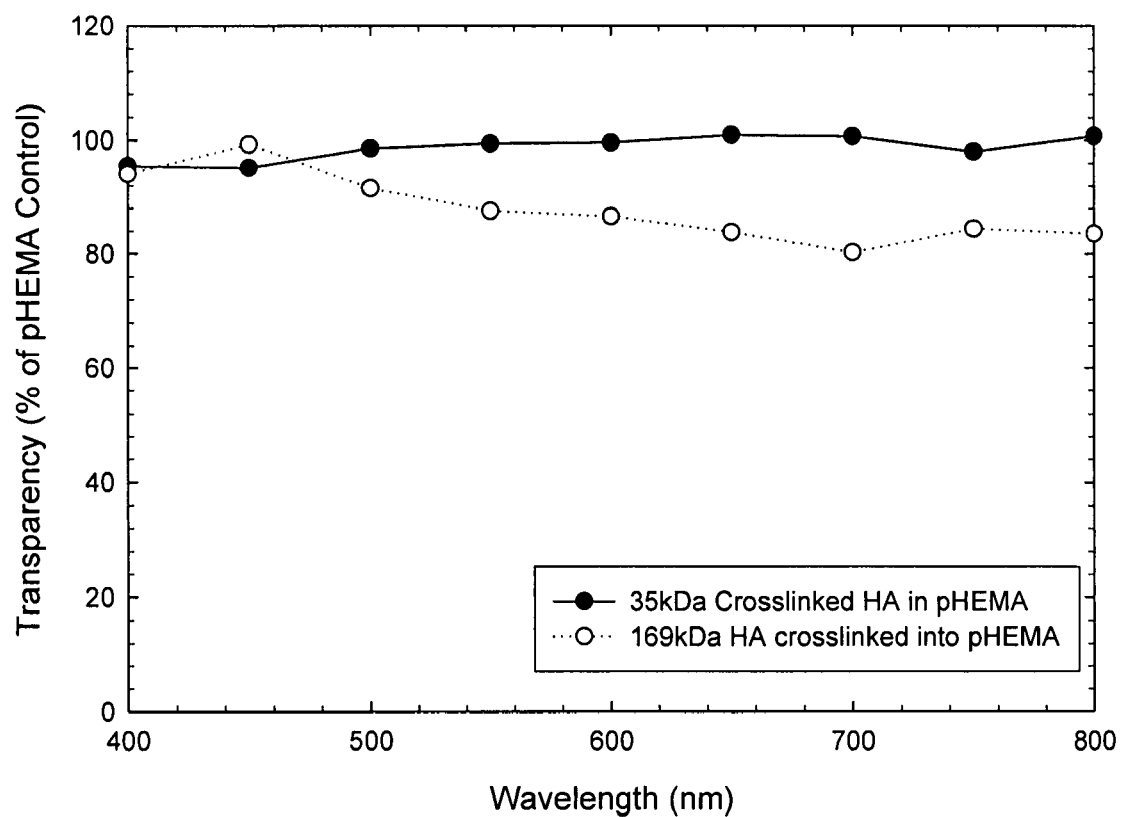
FIG. 3 graphically illustrates the transparency of HA-crosslinked HEMA samples.

Transparency of the HA modified hydrogels and the HA releasing hydrogels was measured by UV spectrophotometry in a wavelength range between 400 and 700 nm. FIG. 3 summarizes the change in transparency with modification relative to the unmodified pHEMA controls. Clearly, incorporation of 35 kDa HA did not have an effect on transparency when compared to the control. However, the samples with incorporated 169 kDa HA showed slight decreases in transparency at high wavelengths, presumably due to the formation of domains of significant size with this higher molecular weight HA.

Water Contact Angles

Figure 4:
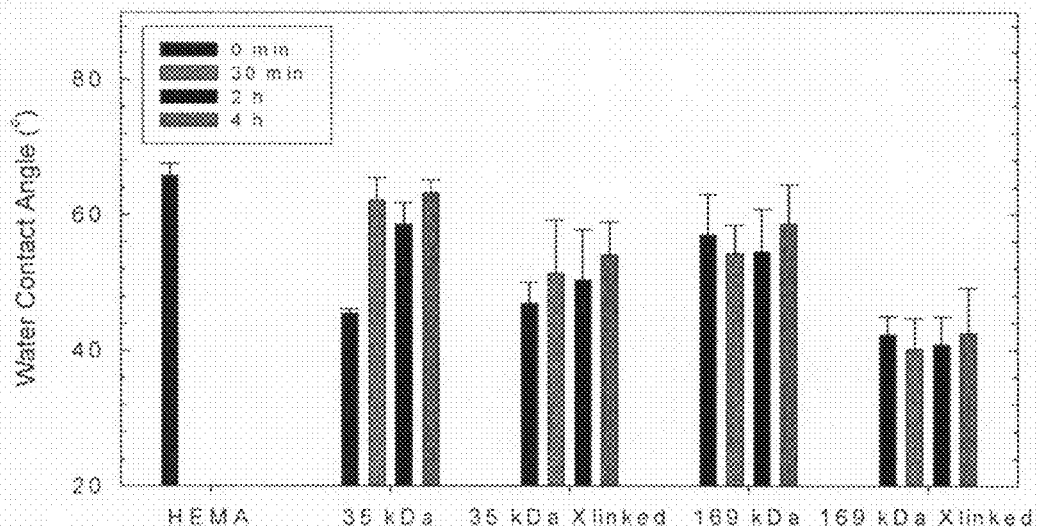
FIG. 4 is a bar graph showing sessile drop water contact angles measured on the surfaces of the different HA-containing hydrogel samples.

Hydrogels containing uncrosslinked HA showed decreased contact angles relative to pHEMA controls immediately following exposure to the liquid at a time which would correspond to zero release time as shown in FIG. 4. Following exposure to PBS buffer, the contact angles for these samples increased. This change in surface properties correlates with the release of HA from the pHEMA over a relatively short period of time. Clearly the released HA is not remaining associated with the surface and therefore is not affecting the surface properties of the material following release. For the 35 kDa sample, the HA appeared to be released within thirty minutes, whereas the contact angles for the 169 kDa samples remained slightly but significantly ($p=0.036$) lower then the pHEMA controls throughout the entire four hours of the experiment.

The crosslinked samples showed significantly lower ($p=0.00037$ and $0.00017$ for 35 kDa and 169 kDa crosslinked HA, respectively) contact angles than the pHEMA controls at all times studied evidencing a decrease in surface friction. Significant changes in the surface properties over longer periods of time are not expected as there were no changes over the four hour period of the study and little or no measurable HA release was observed from these materials at any time. Due to the high hydrophilicity of HA, a decrease in the contact angles was not unexpected. However, with the relatively small amounts of HA incorporated into the matrices, the magnitude of the decreases observed is somewhat surprising. Clearly the incorporation of even a small amount of crosslinked HA into a pHEMA matrix can significantly alter the surface properties of the HEMA matrix.

Atomic Force Microscopy

Atomic force microscopy was used to determine whether the incorporation of the relatively small amounts of HA into the pHEMA hydrogels resulted in changes to the surface roughness of the materials. Roughness values, presented in Table 2, summarize changes to the hydrogels. Clearly, the incorporation of the crosslinked HA increased the surface roughness. This is the expected result and is consistent with observations of others for materials modified, for example, with poly (ethylene oxide) (PEO) (Chen, 2005). In the HA cross-linked hydrogels, the presence of free chains of the hydrophilic HA at the interface presumably results in the formation of a rougher, but based on the water contact angles, more wettable, surface.

TABLE 2

Root mean square roughness results for all materials for the Teflon side.

| Material | Root mean square roughness (nm) |
| --- | --- |
| PHEMA | 1.09 |
| 35 kDa HA Crosslinked into pHEMA | 1.481 |
| 169 kDa HA Crosslinked into pHEMA | 2.02 |

Tensile Strength Testing

Figure 5:
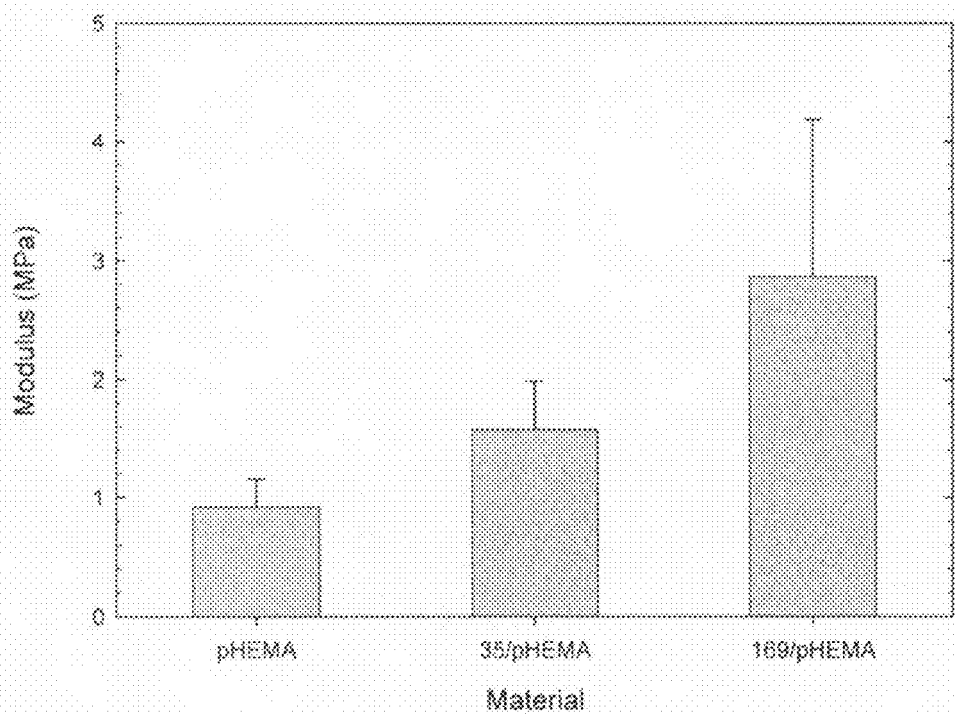
FIG. 5 is a bar graph illustrating modulus of elasticity for HA-crosslinked hydrogel samples.

Mechanical properties of the hydrogels, including maximum tensile strength and modulus of elasticity, were determined by Instron® testing. FIG. 5 shows that a slight increase in the modulus of elasticity was observed with HA incorporation and that this was affected by the molecular weight of crosslinked HA. Since modulus is an indicator of the stiffness of a material, the 169 kDa HA/pHEMA samples appear stiffer than the pHEMA samples, although the differences are not statistically significant (p>0.05).

Figure 6:
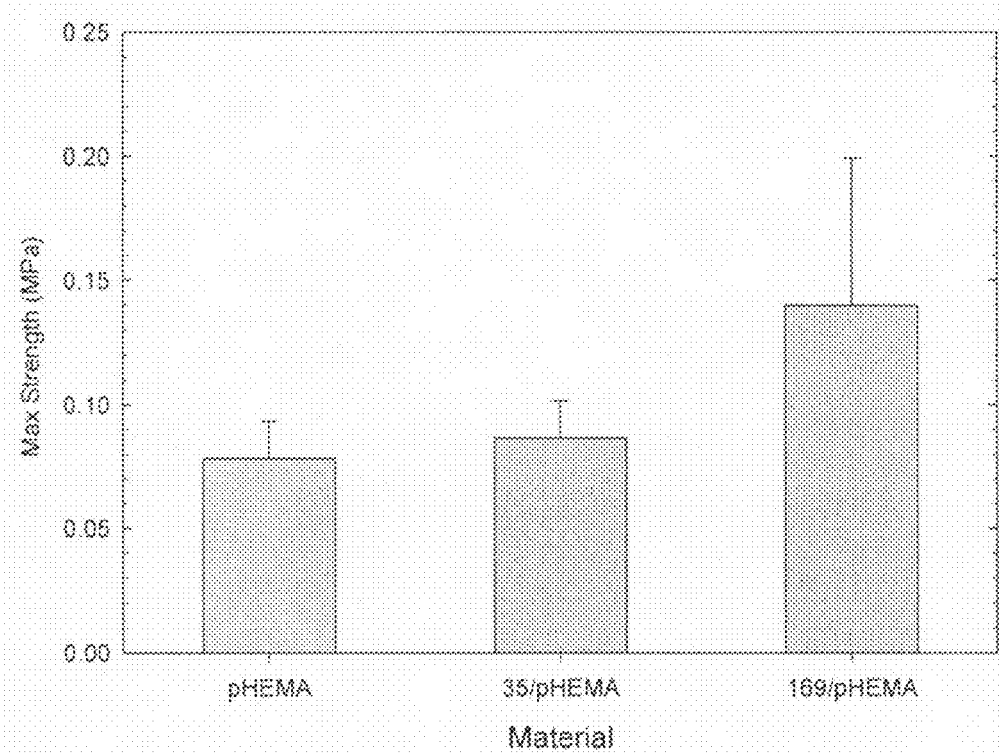
FIG. 6 is a bar graph illustrating the maximum tensile strength of HA-crosslinked hydrogel samples.

Tensile strength results are summarized in FIG. 6. Statistically, there is no difference between the control pHEMA material and the two crosslinked HA materials (p>0.05). However, the 169 kDa material appears to be slightly stronger then the control and the 35 kDa material.

Differential Scanning Calorimetry (DSC)

Glass transition temperatures based on DSC measurements over a temperature range of 40-200° C. are summarized in Table 3. At temperatures above this, decomposition of the samples was observed. Not surprisingly, given the crosslinked nature of these polymers, no melting points were detected. The presence of the very small amounts of HA in the various materials resulted in an increase in the glass transition temperature by a measurable amount. Crosslinking the HA in the samples appeared to have no effect on the glass transition temperature when compared to samples containing uncrosslinked HA. In the case of the crosslinked samples, samples were exposed to a buffer solution to release any unbound HA from the sample prior to analysis and the results are due only to the HA which has been physically trapped within the pHEMA matrix.

TABLE 3

Glass transition temperatures as measured for pHEMA and various pHEMA/HA materials.

| Material | Tg (° C.) |
| --- | --- |
| PHEMA | 105.29 |
| Crosslinked 35 kDa HA | 110.04 |
| Crosslinked 169 kDa HA | 109.54 |
| Uncrosslinked 35 kDa HA | 111.07 |
| Uncrosslinked 169 kDa HA | 112.08 |

Protein Adsorption to HEMA and HA Hydrogel Materials

Figure 7:
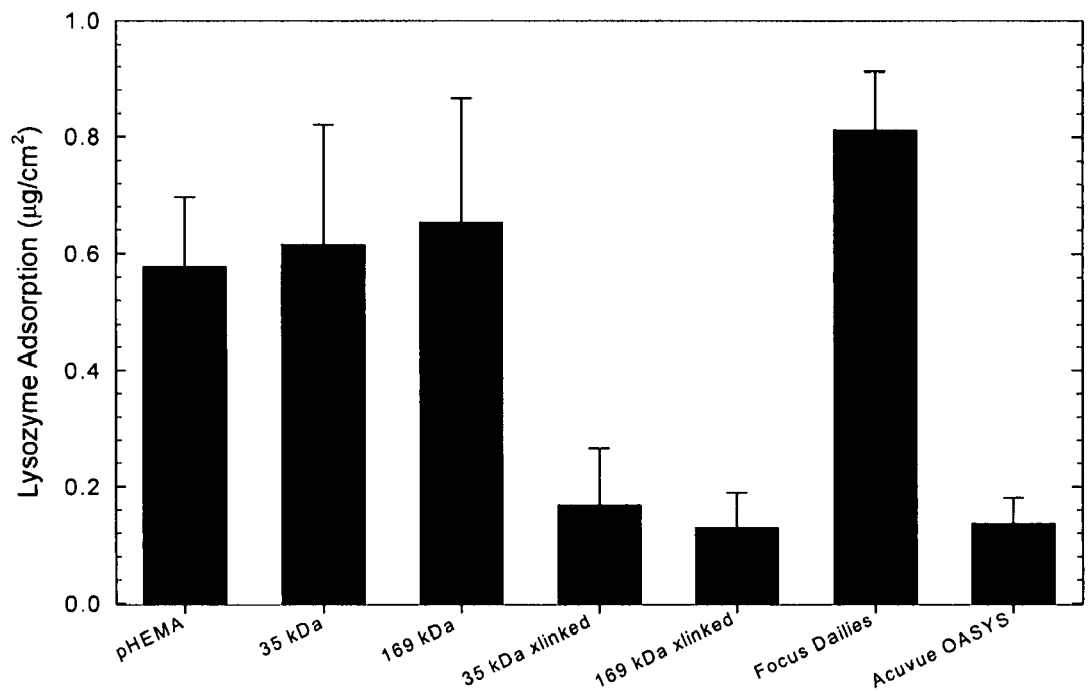
FIG. 7 graphically illustrates lysozyme adsorption from simulated tear solutions to HA containing hydrogels.

The impact of the addition of HA to the hydrogel materials on adsorption of tear film proteins was examined using commercially available lens materials for comparison. Lysozyme adsorption to the various HA-modified hydrogel samples is shown in FIG. 7. While the uncrosslinked HA-modified samples did not exhibit significantly different protein adsorption characteristics in comparison to the pHEMA control, the HA cross-linked samples showed a dramatic decrease in protein adsorption. The adsorbed amounts were below a monolayer of protein in all cases, which is surprising since pHEMA would be expected to rapidly absorb significant amounts of small proteins such as lysozyme (Bohnert et al, 1988; Leahy et al, 1990; Sack et al, 1987). Clearly the presence of the surface bound HA has a significant effect on the adsorption of proteins. Adsorbed protein levels were similar to or lower than those observed with CIBA Vision Focus® DAILIES with AquaRelease and Acuvue® OASYS.

Figure 8:
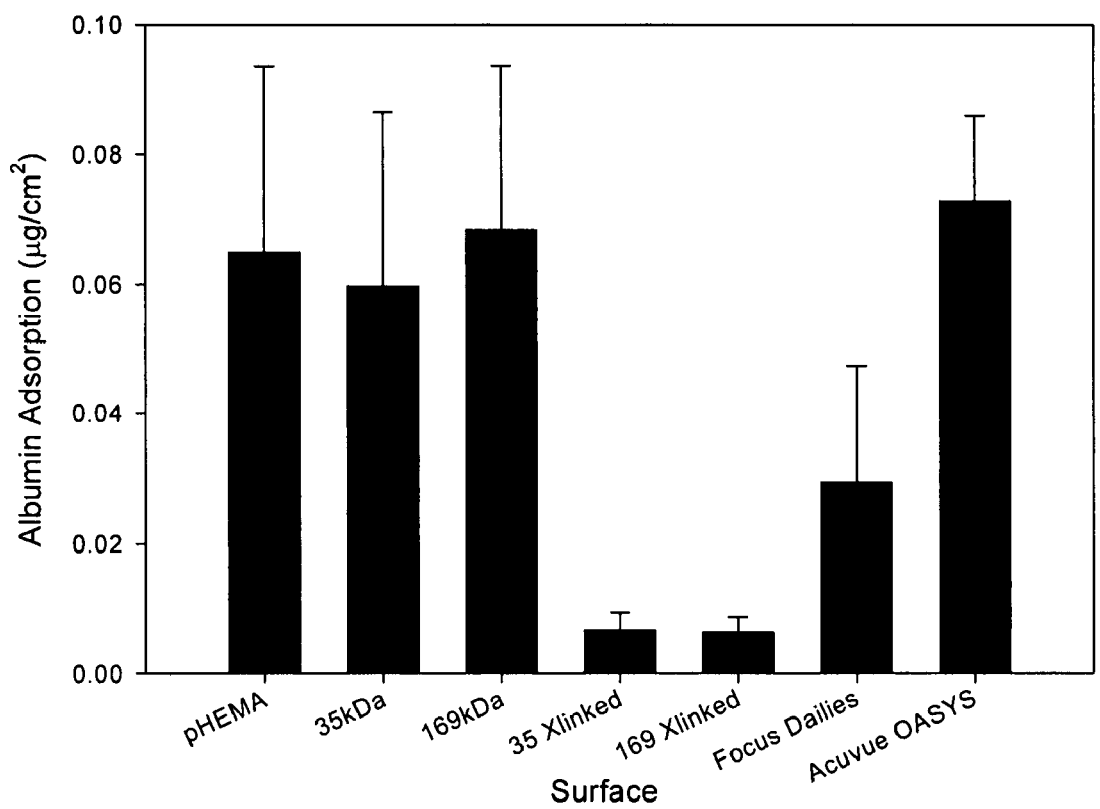
FIG. 8 graphically illustrates albumin adsorption to HA containing hydrogels.
Figure 9:
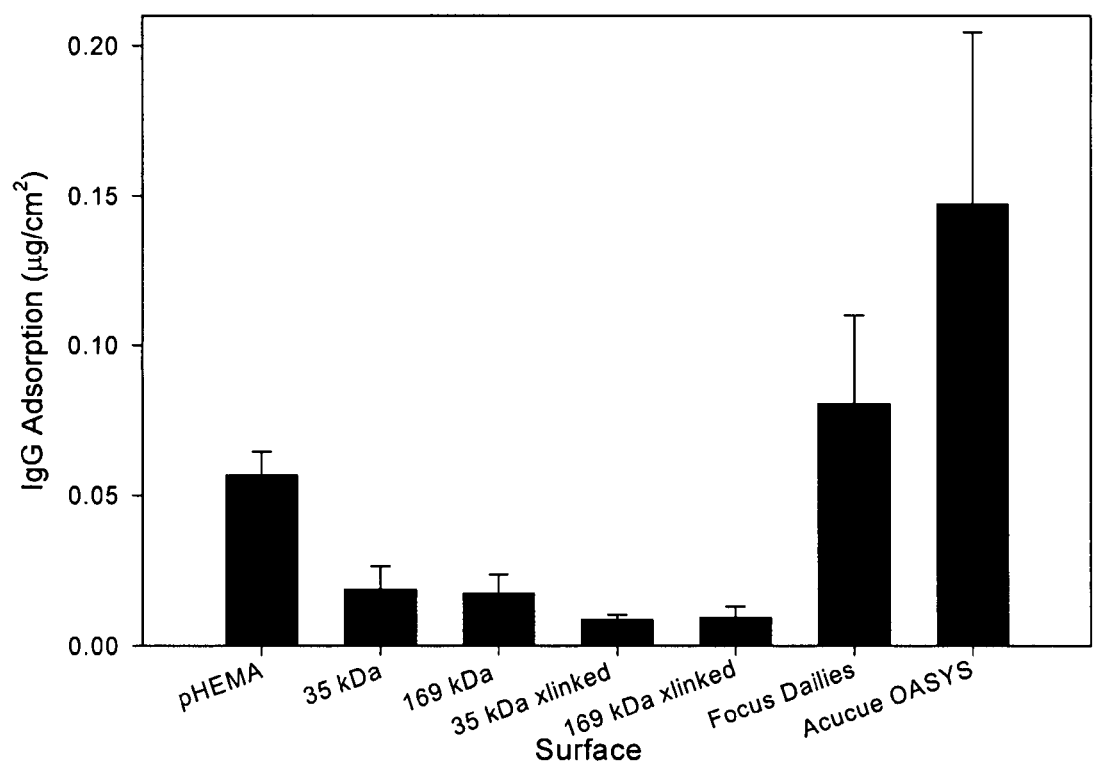
FIG. 9 graphically illustrates IgG adsorption to HA containing hydrogels.

Similar to lysozyme results, the HA cross-linked samples exhibited much lower albumin adsorption values than control, uncrosslinked samples and commercially available lenses as shown in FIG. 8.

For IgG, samples containing releasable HA showed slightly decreased adsorption relative to the control and IgG adsorption was further decreased in the HA crosslinked samples indicating the presence of HA at the surface can inhibit the adsorption of large proteins equally as effectively as small proteins. All adsorption values, including the pHEMA control, were considerably lower than those observed for the commercially available lenses.

Conclusions

HEMA containing either chemically crosslinked or releasable hyaluronic acid was synthesized. While these materials were found to contain only a very small amount of HA, surface analysis by water contact angles demonstrated that the crosslinking modification resulted in increased surface hydrophilicity which remained constant throughout the study. In comparison, the materials containing releasable HA, while showing an initial decrease in contact angle, rapidly reverted to the initial state. The presence of HA in the materials was confirmed by DSC and AFM with increases in glass transition temperatures for HA-containing materials as well as increases in surface roughness, as measured by AFM. Optical transparency was not impacted by the presence of 35 kDa crosslinked HA although a slight decrease in optical transparency was observed by UV spectroscopy for materials containing crosslinked 169 kDa HA, particularly at higher wavelengths. Despite the presence of only a small amount of immobilized HA, the adsorption of all tear proteins studied was significantly decreased when compared to unmodified pHEMA controls and was comparable or lower than the levels of protein adsorption observed with commercial lenses. In comparison, releasable HA had no significant effect on protein adsorption.

Example 2

HA-Modified Silicone/HEMA Copolymer

Materials and Methods

IRGACURE was purchased from Ciba (Mississauga, ON). Methacryloxy propyl tris (trimethylsiloxy) silane (TRIS) was purchased from Gelest (Morrisville, Pa.). TRIS monomer and hydroxylethyl methacrylate (HEMA) monomer were purified to remove the 4-methoxyphenol (MEHQ) polymerization inhibitor by passing the monomer through a column packed with Aldrich inhibitor removers (Sigma-Aldrich, Oakville ON). HEMA, TRIS and 5% by weight ethylene glycol dimethacrylate (EGDMA) were mixed. Subsequently, 0.5% by weight IRGACURE was added and mixed thoroughly. The solution was poured into the custom Teflon® mold, placed in the UV chamber (Cure Zone 2 Con-trol-cure) and allowed to cure for 25 minutes. The surfaces were subsequently placed in an oven at 50° C. overnight to ensure complete reaction of the monomer. Following polymerization, the materials were removed from the molds and placed in water for over two days to remove any unreacted monomer from the samples. Samples were cut to the desired size, typically ¼ inch disks, and placed in a 48 well plate to be dried at 40° C. overnight.

Hyaluronic Acid Loading and Incorporation

Solutions containing hyaluronic acid (HA) (5 g/L) and diaminobutane-4 (DAB-4) generation 1 dendrimer (5 g/L) (Sigma, Milwaukee Wis.) were prepared in 30% ethanol/70% water as described above in Example 1. The ethanol/water solution was selected to maximize solvent uptake and HA loading into the materials. Two molecular weights of HA were studied: 35 kDa and 169 kDa. Dried hydrogel disks were placed in an excess amount of the HA-containing solutions in 48-well plates sealed using parafilm and stored for a minimum of four days at 4° C. to ensure a maximum uptake of HA.

Following HA loading, a solution containing approximately 1% by weight 1-ethyl-3-(3-dimethylaminopropyl)-carbodiimide (EDC) in water was prepared and the loaded samples were placed in an excess of this reagent for a period of 24 hours for crosslinking of the loaded HA. This was followed by release of the unreacted HA and dendrimer by soaking in water for a minimum of two days prior to characterization.

Surface Hydrophilicity as Measured by Water Contact Angles

Sessile drop advancing and receding contact angles provide relative information about the surface hydrophilicity and hydrophobicity. Samples were placed on glass slides and dried at 37° C. overnight. Contact angles were measured using drops of Milli-Q® water with a volume no greater than 3 µL using a Ramé-Hart NRL 100-00 goniometer.

Differential Scanning Calorimetry

A TA 2910 MDSC Differential Scanning Calorimeter was used to measure the glass transition temperature of the materials produced. This method was used to discern any changes that may have occurred in the thermal properties of the material as a result of the incorporation and crosslinking of the HA. 2-10 mg freeze-dried samples of TRIS/pHEMA, TRIS/pHEMA/35 kDa crosslinked HA and TRIS/pHEMA/169 kDa crosslinked HA were placed in a hermetically sealed pan and heated to 300° C. at a rate of 15° C./min.

Protein Adsorption to Modified Materials

Lysozyme, the most common protein found associated with contact lens materials, was radiolabeled with $Na^{125}I$ using the iodine monochloride method (ICI) (McFarlane, 1963). Unbound $^{125}I$ was removed by passing the labeled protein solution through a 3 ml syringe packed with AG 1-X4 (100-200 dry mesh in chloride form) (Bio-Rad, Hercules, Calif.). Free iodide was measured by trichloroacetic acid precipitation of the protein. The free iodide was less then 2% of total radioactivity. A simulated tear solution (Bright, 1993), the composition of which is shown in Table 1 (above) was prepared in PBS using 8% radiolabelled lysozyme.

Samples, having been equilibrated in PBS, were wiped dry using a Kimwipe® and subsequently placed in 24-well plates. Artificial tear solutions (150 µl) were added to the wells and incubated for two hours at room temperature. This was followed by three five minute rinses with fresh PBS buffer to remove any loosely adherent protein. The surfaces were subsequently counted for radioactivity using a Wizard® 3 1480 Automatic Gamma Counter (PerkinElmer) and the adsorbed amounts were calculated using background-corrected surface counts relative to the solution count for the individual protein solution.

Results and Discussion

Water Uptake Studies

Figure 10:
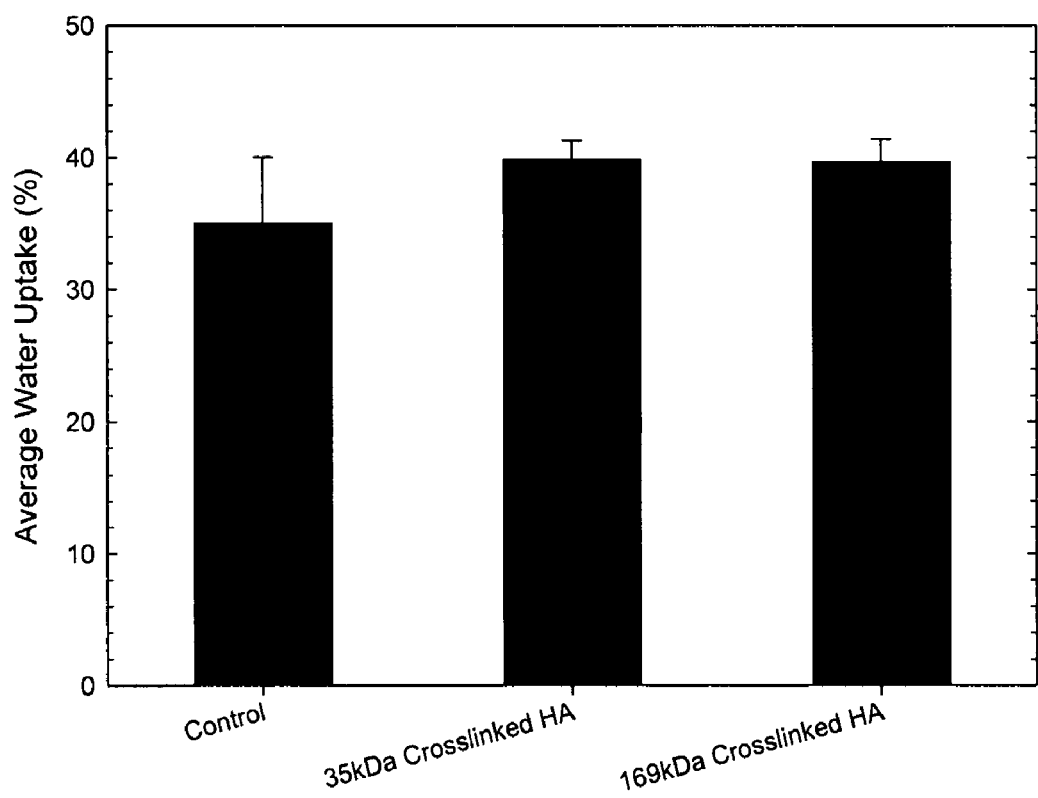
FIG. 10 is a bar graph illustrating the water uptake properties of HA-crosslinked 4% TRIS/96% HEMA hydrogels.
Figure 11:
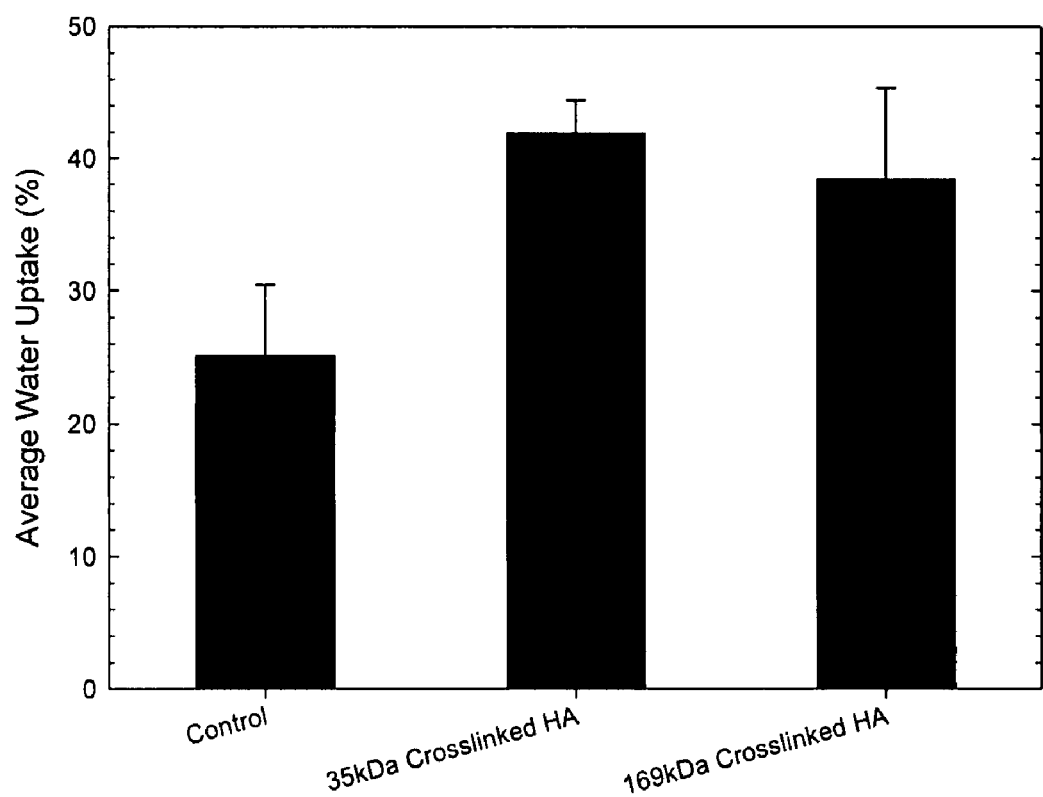
FIG. 11 is a bar graph illustrating the water uptake properties of HA-crosslinked 10% TRIS/90% HEMA hydrogels.

Water uptake was measured for both 4% TRIS 96% PHEMA and for 10% TRIS 90% PHEMA and is shown in FIG. 10 and FIG. 11, respectively. In the case of the 4% TRIS materials, no significant difference was observed in water uptake for either 35 kDa and 169 kDa crosslinked HA (p>0.05). In the case of the 10% TRIS 90% PHEMA samples, significant increases in water uptake as compared with the control were noted with the incorporation of both 35 kDa and 169 kDa HA (p<0.05). TRIS is a hydrophobic polymer and increased amounts of TRIS, as expected, resulted in lower water uptake. However, in the 10% TRIS 90% PHEMA, the presence of HA resulted in water uptakes similar to those observed for the 4% TRIS materials. Presumably, as the amount of crosslinked HA in the material increases, so does water uptake. There was no significant difference (p>0.05) in water uptake between the 35 kDa HA and the 169 kDa crosslinked HA.

Water Contact Angles

Figure 12:
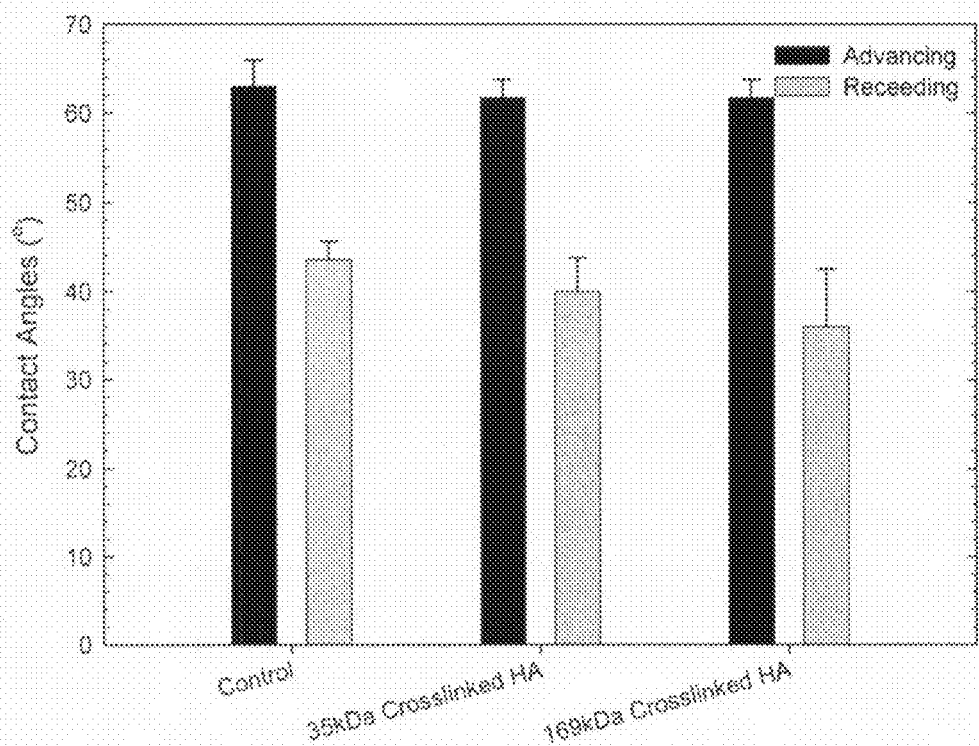
FIG. 12 graphically illustrates the water contact angles measured on the surfaces of HA-crosslinked 4% TRIS/96% HEMA hydrogels.

In the case of the 4% TRIS materials, summarized in FIG. 12, the presence of HA appears to have no effect on both advancing and receding contact angles (p>>0.05). This result provides evidence that the amount of HA in the samples is relatively small. Similarly, molecular weight differences were found not to affect either the advancing or receding water contact angles (p>0.05).

Figure 13:
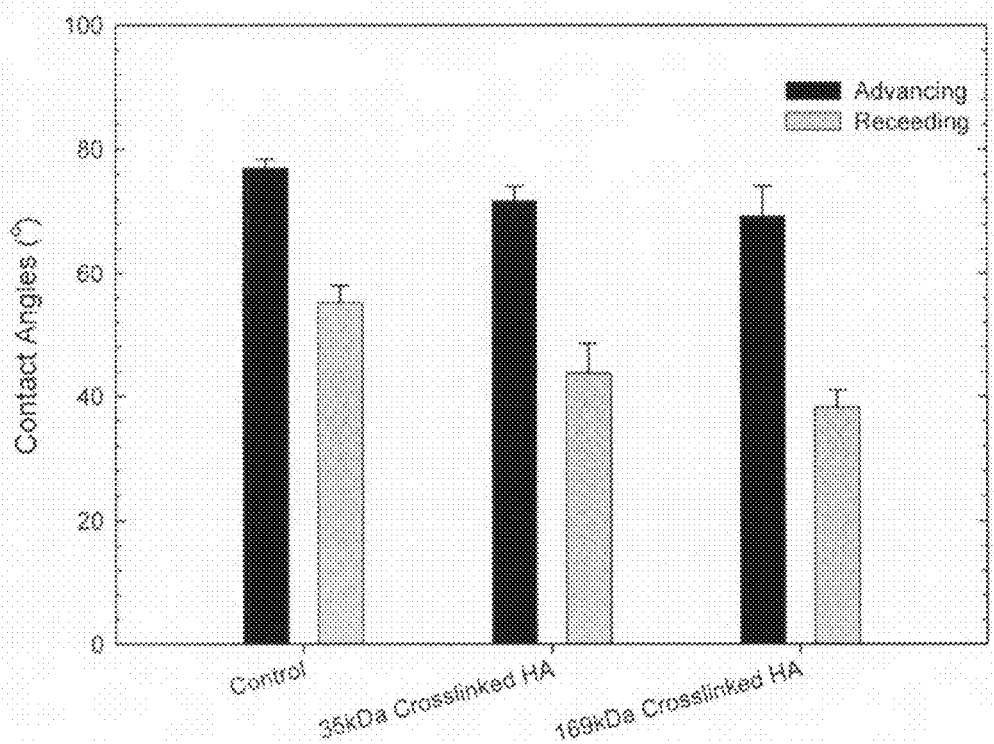
FIG. 13 graphically illustrates the water contact angles measured on the surfaces of HA-crosslinked 10% TRIS/90% HEMA hydrogels.

The 10% TRIS materials, summarized in FIG. 13, show consistent increases in hydrophilicity as compared with the 4% TRIS materials. 35 kDa crosslinked HA resulted in significantly lower advancing and receding contact angles (p<0.05), while 169 kDa crosslinked samples resulted in significantly lower receding contact angles (p<0.05). However, no differences in the advancing angles were observed (p=0.056).

Differential Scanning Calorimetry

DSC measurements on the samples were performed for temperatures ranging from 40-200° C. At temperatures above this, decomposition of the samples was observed. Glass transition temperatures are summarized in Table 5.

TABLE 4

Glass transition temperature for modified and unmodified materials as measured by differential scanning calorimetry.

| Material | Tg (° C.) |
|---|---|
| 10% TRIS 90% pHEMA Control | 116.82 |
| 10% TRIS 90% pHEMA 35 kDa crosslinked HA | 119.99 |
| 10% TRIS 90% pHEMA 169 kDa crosslinked HA | 119.93 |
| 4% TRIS 96% pHEMA Control | 116.74 |
| 4% TRIS 96% pHEMA 35 kDa crosslinked HA | 120.64 |
| 4% TRIS 96% pHEMA 169 kDa crosslinked HA | 118.61 |

No melting points were detected, due to the nature of these crosslinked polymers. However, the presence of HA results in an increase in the glass transition temperature by a measurable amount, despite the fact that only a very small amount of HA is present in the samples. In the case of the crosslinked samples, samples were exposed to a buffer solution to release any unbound HA from the sample prior to analysis and therefore, the results can be attributed only to HA which has been physically trapped within the TRIS/pHEMA matrix. Increased glass transition temperature for the crosslinked samples confirms the presence of crosslinked HA.

Silicone Hydrogel Lysozyme Adsorption

Figure 14:
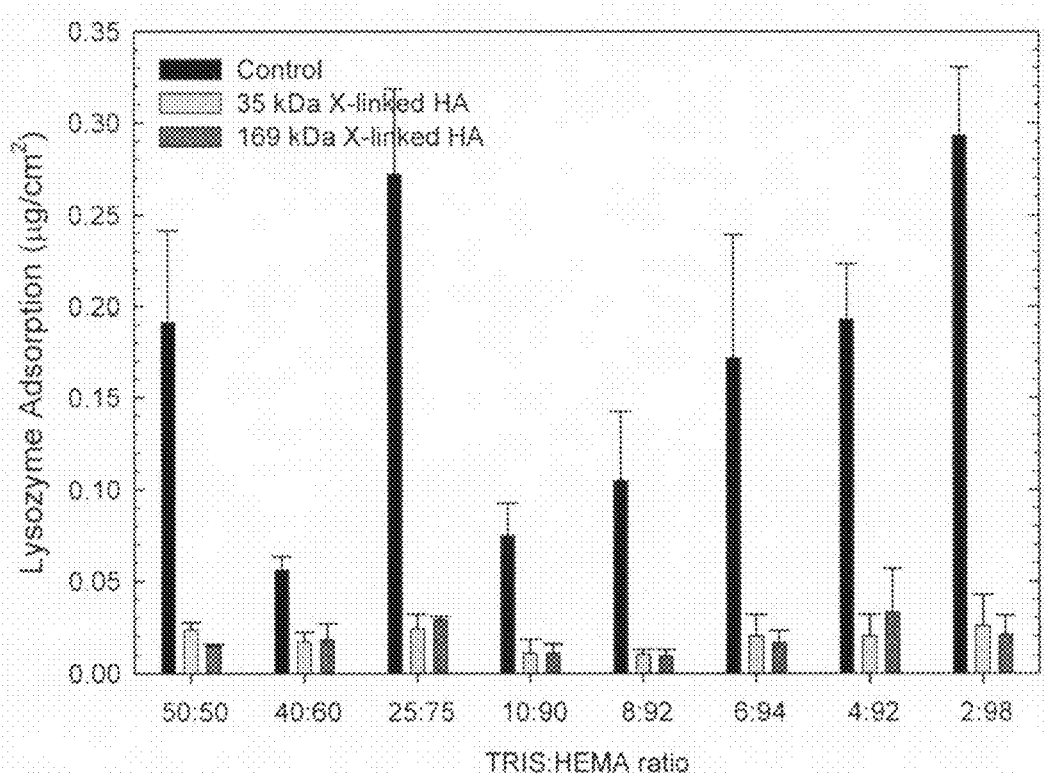
FIG. 14 graphically illustrates lysozyme adsorption to HA-containing TRIS-silicone hydrogels.

Protein adsorption studies were performed using model silicone hydrogel materials prepared using the different ratios of TRIS and pHEMA in order to determine the potential ability of incorporated HA to reduce protein adsorption on silicone hydrogels. Lysozyme adsorption from a simulated tear solution was used to examine the potential of this modification for reducing protein fouling on these materials as lysozyme is the protein most often associated with contact lens materials. Since all unreacted monomer or free HA was extracted by extended soaking in water, the observed effects are due to the presence of physically incorporated HA. FIG. 14 summarizes adsorption results for hydrogels of varying TRIS content. The listed ratios are the TRIS:pHEMA ratio used in preparation of the polymer. Consistent with the results obtained for the pHEMA only hydrogels (as set out in Example 1), the presence of crosslinked HA was shown to dramatically decrease lysozyme adsorption when compared to unmodified controls.

Conclusions

The incorporation of crosslinked HA into model silicone hydrogel materials resulted in dramatic decreases in the adsorption and uptake of lysozyme as a model tear protein. The presence of HA in the materials can be confirmed by DSC.

REFERENCES

[1] Gellatly K, Brennan N, Efron N. Visual decrement with deposit accumulation on HEMA contact lenses. *Am J Optom Physiol Opt.* 1988; 65:937-941.
[2] Pritchard N, Form D, Weed K. Ocular and subjective responses to frequent replacement of daily wear soft contact lenses. *CLAO J.* 1996; 22:53-59.
[3] Jones L, Franklin V, Evans K, Sariri R, Tighe B. Spoilation and clinical performance of monthly vs three monthly disposable contact lenses. *Optom Vis Sci.* 1996; 73:16-21.
[4] Bleshoy H, Guillon M, Shah D. Influence of contact lens material surface characteristics on replacement frequency. *Int Contact Lens Clin.* 1994; 21:82-94.
[5] Refojo M, Holly F. Tear protein adsorption on hydrogels: A possible cause of contact lens allergy. *Contact Intraoc Lens Med J.* 1977; 3:23-35.
[6] Kotow M, Holden B, Grant T. The value of regular replacement of low water content contact lenses for extended wear. *J Am Optom Assoc.* 1986; 58:461-464.
[7] Porazinski A D, Donshik P C. Giant papillary conjunctivitis in frequent replacement contact lens wearers: A retrospective study. *CLAO J.* 1999; 25:142-147.
[8] Orsborn G, Zantos S. Practitioner survey: Management of dry eye symptoms in soft lens wearers. *Contact Lens Spectrum.* 1989; 4:23-26.
9 Weed K, Fonn D, Potvin R. Discontinuation of contact lens wear. *Optom Vis Sci.* 1993; 70:140.
Aragona, P., Papa, V., Micali, A., Santocono, M., Milazzo, G. (2002). Long term treatment with sodium hyaluronate-containing artificial tear reduces ocular surface damage in patients with dry eye. *Br. J. Opthalmol.*, 86, 181-184.
Bright A M., Tighe, B J. (1993). The composition and interfacial properties of tears, tear substitutes and tear models. *J BCLA* 16(2), 57-66
Bohnert, J. L., Horbett, T. A., Ratner, B. D., Royce, F. H. (1988) Adsorption of proteins from artificial tear solutions to contact lens materials. *Optom Vis Sci.*, 29, 362-373
Brennan, N., Coles, M-L. (2000) Deposits and symptomatology with soft contact lens wear. *ICLC* 27:76-100
Buenter, R-P., Sodium hyaluronate based ophthalmic formulation for use in eye surgery. U.S. Pat. No. 5,880,107. Issue Date: Mar. 9, 1999.
Cassinelli, C., Morra, M., Pavesio, A., Renier, D. (2000). Evaluation of interfacial properties of hyaluronan coated poly methylmethacrylate) intraocular lenses. *J. Biomater. Sci. Polymer Edn,* 11(9), 961-977.
Chen, H., Brook, M. A., Chen, Y., Sheardown, H. (2005) Surface properties of PEO-silicone composites: reducing protein adsorption. *J. Biomater. Sci. Polymer Edn,* 16(4), 531-548.
Elbert, D. L., Hubbell, J. A. (1996) Surface treatments of polymers for biocompatibility *Annu. Rev. Mater. Sci.* 26, 365-394
Fowler S A, Korb D R, et al.: Deposits on soft contact lenses of various water contents. CLAO J 1985; 11; 2: 124-127.
Göbbels, M., & Spitznas, M. (1992). Corneal epithelial permeability of dry eyes before and after treatment with artificial tears. *Opthalmology,* 99, 873-878.
Holzer, M. P., Tetz, M. R., Auffarth, G. U., Welt, R., Völcker, H. (2001). Effect of healon5 and 4 other viscoelastic substances on intraocular pressure and endothelium after cataract surgery. *J Cataract Refract Surg.,* 27(2), 213-218.
Jones, L., Mann, A. P., Evans, K. P., Franklin, V. P., Tighe, Brian. (2000). An in vivo comparison of the kinetics of protein and lipid deposition on group II and group IV frequent-replacement contact lenses. *Optom Vis Sci,* 77(10), 503-510.
Lancaster C: A daily disposable lens designed for comfort. Contact Lens Spectrum 2007; 22; 3: 40-43.
Leahy C D, Mandell R B, et al.: Initial in vivo tear protein deposition on individual hydrogel contact lenses. Optom Vis Sci 1990; 67; 7: 504-511.
Limberg, M B., McCaa, C., Kissling, G E., Kaufman, H E. (1987) Topical application of hyaluronic acid and chondroitin sulfate in the treatment of dry eyes. *Am. J. Opthalmol.* 103(2) 194-197
Lofas, S. (1995) Dextran modified self-assembled monolayer surfaces for use in biointeraction analysis with surface plasmon resonance. *Pure Appl. Chem.* 67(5) 829-834.
McFarlane, A. S. (1963). IN VIVO Behavior of I$^{131}$-Fibrinogen. *J Clin Invest,* 42(3), 346-361.
Napper, D. H. (1983). *Polymeric stabilization of colloidal dispersions.* New York: Academic Press.
Nicholson, P. C., Vogt, J., (2001) Soft contact lens polymers: an evolution. *Biomaterials* 22(24), 3273-3283
Nishida, T., Nakamura, M., Mishima, H., & Otori, T. (1991). Hyaluronan stimulates corneal epithelial migration. *Exp Eye Res,* 53, 753-758.
Park, S. N., Lee, H J, Lee, K H, Suh, H. (2003) Biological characterization of EDC-crosslinked collagen-hyaluronic acid matrix in dermal tissue restoration. *Biomaterials* 24(9), 1631-1641
Peterson R C, Wolffsohn J S, et al.: Clinical performance of daily disposable soft contact lenses using sustained release technology. Cont Lens Anterior Eye 2006; 29; 3: 127-134.
Pritchard N, Fonn D, et al.: Ocular and subjective responses to frequent replacement of daily wear soft contact lenses. CLAO J 1996; 22; 1: 53-59.

Sack R A, Jones B, et al.: Specificity and biological activity of the protein deposited on the hydrogel surface. Relationship of polymer structure to biofilm formation. Invest Opthalmol Vis Sci 1987; 28; 5: 842-849.

Sand, R. B., Marner, K., Norn, M. S. (1989). Sodium hyaluronate in the treatment of keratoconjunctivitis sicca. *Acta Opthalmol*, 67, 181-183.

Schwarz, S., Nick, J. (2006) Effectiveness of lubricating daily disposable lenses with different additives *The Optician* 231(6050) 22-26

Shinmmura, S., Ono, M., Shinozaki, K., Toda, I., Takamura, E., Mashima, Y., et al. (1995). Sodium hyaluronate eyedrops in the treatment of dry eyes. *Br J Opthalmol*, 79, 1007-1011.

Polack, M. K., McNiece, T. M. (1982). The treatment of dry eyes with Na hyaluronate (Healon) A preliminary report. *Cornea*, 1, 133-136.

Van Beek, M., Unsworth, L., Jones, L, Sheardown, H To be submitted

Veys J, Meyler J: Do new daily disposable lenses improve patient comfort? Optician 2006; 231; 6046: 34-36.

Wang, X H., Li, D P., Wang, W J., Feng, Q L., Cui, F Z., Xu, Y X., Song, X H., van der Werf, M. (2003) Crosslinked collagen/chitosan matrix for artificial livers. *Biomaterials* 24(19), 3213-3220.

Yokoi, N., Komuro, A., Nishida, K., Kinoshita, S. (1997). Effectiveness of hyaluronan on corneal epithelial barrier function in dry eye. *Br. J. Opthalmol.*, 81, 533-536.

Young, G., Veys, J., Pritchard, N., Coleman, S. A multi-centre study of lapsed contact lens wearers. Ophthal. Physiol. Opt. 2002 22: 516-527

The invention claimed is:

1. A polymeric matrix comprising a biopolymer and crosslinked hyaluronic acid, wherein the hyaluronic acid is cross-linked with a dendrimer, and the crosslinked hyaluronic acid is immobilized within the biopolymer.

2. A polymeric matrix as defined in claim 1, containing at least about 1% by weight of hyaluronic acid.

3. A polymeric matrix as defined in claim 1, comprising a polymer selected from the group consisting of an acrylic-based polymer; and a silicone polymer.

4. A polymeric matrix as defined in claim 3, wherein the polymer is selected from the group consisting of poly methyl methacrylate, poly (hydroxyethyl methacrylate) (pHEMA), poly N-isopropyl acrylamide and poly acrylic acid.

5. A polymeric matrix as defined in claim 3, wherein the polymer is a copolymer of methacryloxy propyl tris (trimethylsiloxy) silane (TRIS) and an acrylic-based polymer.

6. A polymeric matrix as defined in claim 1, wherein the hyaluronic acid has a molecular weight of between about 6 kDa and 300 kDa.

7. A polymeric matrix as defined in claim 6, wherein the hyaluronic acid has a molecular weight of between about 30 kDa and about 180 kDa.

8. A polymeric matrix as defined in claim 1, having a surface friction which is reduced by at least about 10% in comparison with the surface friction of a corresponding biopolymer that is not modified to incorporate hyaluronic acid.

9. A polymeric matrix as defined in claim 1, characterized by reduced protein adsorption of at least about 10% in comparison with a corresponding biopolymer that is not modified to incorporate hyaluronic acid.

10. A polymeric matrix as defined in claim 1, wherein the dendrimer comprises a core monomer selected from the group consisting of an alkyl-diamine, an alkyl dicarboxylic acid and an aldehyde-terminated core.

11. A polymeric matrix as defined in claim 10, wherein the dendrimer is selected from the group consisting of ethyl-diamine, propyl-diamine; malonic acid, succinic acid, adipic acid and polyamidoamine (PAMAM).

12. A method of making hyaluronic acid-retaining biopolymer comprising the steps of
 a) incubating hyaluronic acid with a host polymer in the presence of a dendrimer under conditions suitable to result in hyaluronic acid uptake by the polymer; and
 b) incubating the hyaluronic acid polymer mixture with a facilitating agent for a period of time sufficient to result in crosslinking of the hyaluronic acid within the polymer.

13. A method as defined in claim 12, comprising a polymer selected from the group consisting of an acrylic-based polymer; and a silicone polymer.

14. A method as defined in claim 13, wherein the polymer is selected from the group consisting of poly methyl methacrylate, poly (hydroxyethyl methacrylate) (pHEMA), poly N-isopropyl acrylamide and poly acrylic acid.

15. A method as defined in claim 12, wherein the polymer is a copolymer of methacryloxy propyl tris (trimethylsiloxy) silane (TRIS) and an acrylic-based polymer.

16. A method as defined in claim 12, wherein the hyaluronic acid has a molecular weight of between about 6 kDa and 300 kDa.

17. A method as defined in claim 16, wherein the hyaluronic acid has a molecular weight of between about 30 kDa and about 180 kDa.

18. A method as defined, in claim 12, wherein the dendrimer comprises a core monomer selected from the group consisting of an alkyl-diamine, an alkyl dicarboxylic acid and an aldehyde-terminated core.

19. A polymeric matrix as defined in claim 18, wherein the dendrimer is selected from the group consisting of ethyl-diamine, propyl-diamine; malonic acid, succinic acid, adipic acid and polyamidoamine (PAMAM).

20. A method as defined in claim 12, wherein the facilitating agent is a carbodiimide.

21. A method as defined in claim 12, wherein step (b) is conducted in the presence of a stability agent.

* * * * *